April 23, 1935.　　　　A. J. WITT　　　　1,998,480
GRAIN REGULATING DEVICE FOR GRAIN BINDERS
Filed March 13, 1934
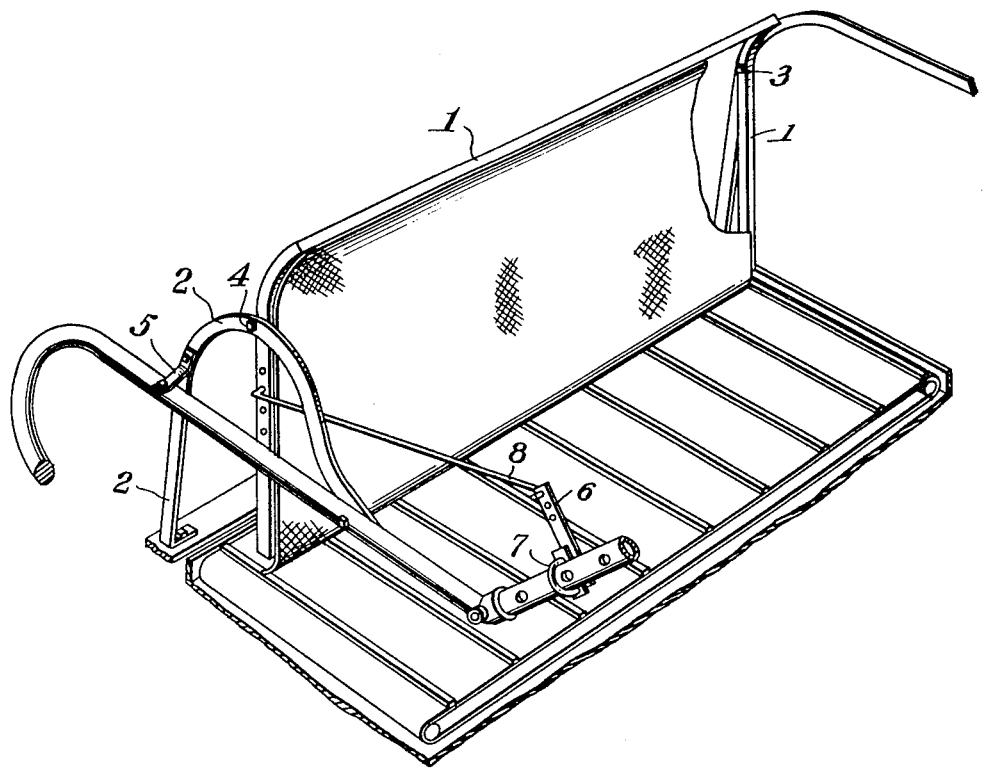
Albert J. Witt　Inventor Patented Apr. 23, 1935

1,998,480

UNITED STATES PATENT OFFICE 1,998,480

GRAIN REGULATING DEVICE FOR GRAIN BINDERS

Albert Joseph Witt, Carmel, Saskatchewan, Canada

Application March 13, 1934, Serial No. 715,356

1 Claim. (Cl. 56—190)

The invention relates to a device which can be attached to any grain binder and controls the position of the grain as it falls onto the platform. It consists of a suspended canvas screen placed near the rear and extending the full length of the platform. The screen is movable about a horizontal axis, and its movement is controlled by the reel frame, to which it is connected by means of an iron rod. When the reel frame, and consequently the reel, is raised or lowered the screen automatically turns about its axis. When the reel is lowered for short grain the screen automatically turns and the bottom moves forward. This has the effect of reducing the width of the platform, and confines the grain to a narrow strip of the canvas so that all the grain is carried up the elevator at one point from which position it reaches the deck and knotter in the proper manner, and all of it is tied into uniform bundles. When the reel is raised for long grain, the bottom of the screen automatically moves to the rear of the platform giving the full platform width or any portion desired. The connection between the screen and the reel frame is adjustable so that their movements can be properly synchronized, especially on those types of binders having a reel frame which moves upon a vertical shaft.

The device is particularly useful in uneven grain as it prevents the lowered reel from throwing the longer grain to the rear of the platform from which position it does not reach the deck so that it can be tied with the shorter grain, and is consequently strewn on the ground and is lost, or else interferes with the efficient operation of the binder. It is also useful in windy weather as it shields the grain better than any existing attachment due to its greater effective size.

The device is simple in construction and can be easily and quickly attached or removed.

Referring to the drawing:

The view shown is an elevation of the device, looking at it from the front end of the binder, and from a slightly raised position.

Numeral 1 is a screen made of canvas tacked to a light hard-wood frame. The top of the frame is slightly curved forward. The end pieces of the frame are drilled to receive the supporting bolts and a connecting rod. Several holes are provided for the connecting rod for adjusting purposes. The canvas extends three or four inches below the bottom of the frame, and this portion is double thickness. Numeral 2 is a support for the deck end of the screen, and consists of a piece of bar iron somewhat U-shaped, having one long and one short leg. The short leg is bowed out to meet the seat-pipe of the binder, and is bolted to it at the reel rack support. The long leg is bolted to the foot-board at the platform drive-sprocket shield. 3 and 4 are bolts which support the screen and about which the screen turns. The screen is placed near the middle of the rear half of the platform, and bolt 3 connects it to the reel support at the grain wheel end. Bolt 4 connects the screen to support 2 at a point near the crown. The elevation of the screen is so adjusted that the lower part of the frame clears the platform by about an inch and a half or two inches. This permits the canvas apron to ride on the slats of the platform canvas at all times. Numeral 5 is a brace which holds support 2 rigid. It is bolted to the seat-pipe by one of the bolts holding the lower end of the seat bracket. Numeral 6 is a piece of bar iron, clamped by 7 to the reel frame. The top end of the bar has a number of holes drilled in it, permitting the adjustment of 8 which is a round iron rod connecting the screen to bar 6. The rod is held in place by a cotter pin at each end.

When the reel is lowered in the usual manner, the reel frame moves forward. This moves bar 6 forward. Rod 8 also moves forward and thus brings the bottom of the screen toward the front of the platform. This confines the grain to one section of the platform, and prevents it being thrown to the rear. When the reel is raised the screen is brought back to its original position, or to any section desired.

I claim as my invention:

An automatic grain regulating device for grain binders comprising a canvas screen pivotally mounted intermediate the upper and lower ends thereof in a substantially vertical position above the binder table over which the conveyor canvas passes, a rubber apron attached to the lower edge of said screen, a pivoted supporting frame for the binder reel and means connecting said pivoted supporting frame to said screen so that adjustment of the binder reel will automatically adjust said screen.

ALBERT J. WITT.